(12) United States Patent
Segawa et al.

(10) Patent No.: US 6,516,916 B2
(45) Date of Patent: Feb. 11, 2003

(54) STEERING DEVICE

(75) Inventors: Masaya Segawa, Yamatokooriyama (JP); Shirou Nakano, Minamikawachi-gun (JP); Katsutoshi Nishizaki, Nabari (JP); Ryouhei Hayama, Nabari (JP); Takanobu Takamatsu, Habikino (JP); Masanori Arima, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/079,796

(22) Filed: Feb. 20, 2002

(65) Prior Publication Data

US 2002/0121400 A1 Sep. 5, 2002

(30) Foreign Application Priority Data

Mar. 5, 2001 (JP) ........................................ 2001-060253

(51) Int. Cl.⁷ ................................................ B62D 5/04
(52) U.S. Cl. .......................... 180/444; 180/446; 701/41
(58) Field of Search ................................. 180/443, 444, 180/446, 447; 701/41

(56) References Cited

U.S. PATENT DOCUMENTS

| 4,658,927 | A | * | 4/1987 | Kanazawa |
| 4,739,855 | A |   | 4/1988 | Miyoshi et al. |
| 4,932,492 | A | * | 6/1990 | Sauvageot et al. |
| 4,951,207 | A | * | 8/1990 | Furukawa et al. |
| 5,174,407 | A | * | 12/1992 | Shimizu et al. |
| 5,205,371 | A |   | 4/1993 | Karnopp |
| 5,423,391 | A | * | 6/1995 | Shimizu |
| 5,511,629 | A | * | 4/1996 | Vogel |
| 6,041,887 | A | * | 3/2000 | Kojo et al. ................ 180/446 |
| 6,135,233 | A | * | 10/2000 | Yamauchi .................. 180/443 |

FOREIGN PATENT DOCUMENTS

JP          63017180          1/1988

* cited by examiner

*Primary Examiner*—Anne Marie Boehler
(74) *Attorney, Agent, or Firm*—Jordan and Hamburg LLP

(57) ABSTRACT

In a steering device, the rotation of the input shaft corresponding to the steering operation is transmitted to the output shaft via a rotation transmission mechanism, and is transmitted from the output shaft to the wheels of the vehicle by a steering gear so that the steering angle varies. A control device controls an electromotive actuator used to drive a constituent element of the rotation transmission mechanism in accordance with a variable quantity that expresses the traveling conditions of the vehicle, on the basis of the respective detection values of an input sensor used to detect the amount of input into the input shaft, an output sensor used to detect the amount of output of the output shaft and a traveling condition sensor used to detect the variable quantity that expresses the traveling conditions of the vehicle, so that the ratio of the transmission of rotation from the input shaft to the output shaft is altered in accordance with the variable quantity that expresses the traveling conditions.

1 Claim, 5 Drawing Sheets

STEERING DEVICE

FIELD OF THE INVENTION

The present invention relates to a steering device in which the ratio of the steering angle to the amount of steering operation can be altered in accordance with vehicle traveling conditions such as the vehicle speed, amount of steering operation and the like.

DESCRIPTION OF THE RELATED ART

In the steering device disclosed in Japanese Patent Application Laid-Open No. SHO63-17180, the rotation of the input shaft in accordance with the steering operation is transmitted to the output shaft via a planetary gear mechanism, and the rotation of this output shaft is transmitted to the wheels of the vehicle by a steering gear so that the steering angle varies. The planetary gear mechanism comprises a carrier which holds planetary gears that engage with a sun gear attached to the input shaft, and a ring gear which engages with the planetary gears. The output shaft is attached to this carrier. A sensor which detects the input rotational angle to the input shaft, a sensor which detects the vehicle speed, a motor which rotationally drives the ring gear, and a control device which controls this motor in accordance with the detected input rotational angle and the vehicle speed, are provided. The ratio of the steering angle to the amount of steering operation can be altered in accordance with the vehicle speed by controlling this motor.

Conventionally, the target control amount of the motor has been determined on the basis of the detected input rotational angle and the vehicle speed, and open loop control which controls the motor regardless of the rotational angle of the output shaft has been performed. Accordingly, a stepping motor has been used as the motor.

In cases where steering operation is performed when the vehicle speed is zero, there is an apprehension that sufficient torque cannot be obtained because of using a stepping motor. Furthermore, the stepping motor may lose its synchronism between input and output. Accordingly, the use of, for example, a direct-current motor or the like, which is driven by using the pulse width modulation method in accordance with the target driving current, has been considered as a substitute for a stepping motor. However, in the case of the above described open-loop control, appropriate control cannot be achieved.

SUMMARY OF THE INVENTION

The present invention is a steering device in which the rotation of an input shaft in accordance with the steering operation is transmitted to an output shaft via a rotation transmission mechanism, the rotation of the output shaft is transmitted to the wheels of the vehicle by a steering gear so that the steering angle varies, and an electromotive actuator used to drive a constituent element of the rotation transmission mechanism is controlled by a control device in accordance with a variable quantity that expresses a traveling condition of the vehicle, this steering device comprising an input sensor for detecting the amount of input into the input shaft, an output sensor for detecting the amount of output of the output shaft, and a traveling condition sensor for detecting the variable quantity that expresses the traveling condition, wherein the control device controls the electromotive actuator by closed-loop control on the basis of the detection values of the input sensor, output sensor and traveling condition sensor so that the ratio of the transmission of rotation from the input shaft to the output shaft varies in accordance with the variable quantity that expresses the traveling condition.

In the present invention, the electromotive actuator used to drive the constituent element of the rotation transmission mechanism is controlled by closed-loop control, and thus there is no need to use a stepping motor as the actuator.

It is preferable that the rotational angle of the input shaft is detected as the amount of input by the input sensor; the rotational angle of the output shaft is detected as the amount of output by the output sensor; at least one of the vehicle speed and amount of the steering operation is detected as the variable quantity that express the traveling condition; the rotation transmission mechanism is constituted by a planetary gear mechanism in which a planetary gear that engages with a sun gear and a ring gear is held by a carrier, a first planetary gear element that is one of the elements consisting of the sun gear, ring gear and carrier is connected to the input shaft, a second planetary gear element that is another one of the elements consisting of the sun gear, ring gear and carrier and that is not connected to the input shaft is connected to the output shaft, a third planetary gear element that is the other of the elements consisting of the sun gear, ring gear and carrier that is not connected to the input and output shafts is rotationally driven by the electromotive actuator; and the control device stores a first relationship between the amount of input into the input shaft, the variable quantity that expresses the traveling condition and the target control amount of the output shaft, calculates the target control amount of the output shaft on the basis of the stored first relationship, the detection value of the input sensor and the detection value of the traveling condition sensor, stores a second relationship between the target control amount of the electromotive actuator and the deviation between the target control amount of the output shaft and the amount of output of the output shaft, calculates the target control amount of the electromotive actuator on the basis of the stored second relationship, the calculated target control amount of the output shaft and the detection value of the output sensor, and controls the electromotive actuator on the basis of the calculated target control amount.

The amount of input into the input shaft corresponds to the amount of steering operation, and the amount of output of the output shaft corresponds to the steering angle. Therefore, the control for the purpose of altering the ratio of the steering angle to the amount of steering operation can be accurately performed, by directly detecting the amount of input into the input shaft and the amount of output of the output shaft and determining the target control amount of the electromotive actuator on the basis of these detected quantities.

According to the present invention, the ratio of the steering angle to the amount of steering operation can be altered in accordance with the traveling condition of the vehicle without using a stepping motor as the electromotive actuator. Accordingly, there is no insufficiency of torque and loss of synchronism between input and output. Furthermore, since the electromotive actuator is controlled by closed-loop control by directly detecting the amount of output of the output shaft, there is no need to use a servo motor, the output of which corresponds to a target value by detecting the motor rotational angle for the purpose of feedback in the closed-loop control. Specifically, in the case of employing a servo motor, there is a danger that the output of the servo motor cannot corresponds to the target value because it changes while being transmitted to the output shaft via the rotation transmission mechanism. To the contrary, according to the present invention, since the electromotive actuator is controlled by closed-loop control with the amount of output of the output shaft being directly detected and being used as a target value, control for the purpose of altering the ratio of the steering angle to the amount of steering operation can be performed precisely.

DESCRIPTION OF THE PREFERRED EMBODIMENTS

An embodiment of the present invention is described below with reference to the attached figures.

Figure 1:
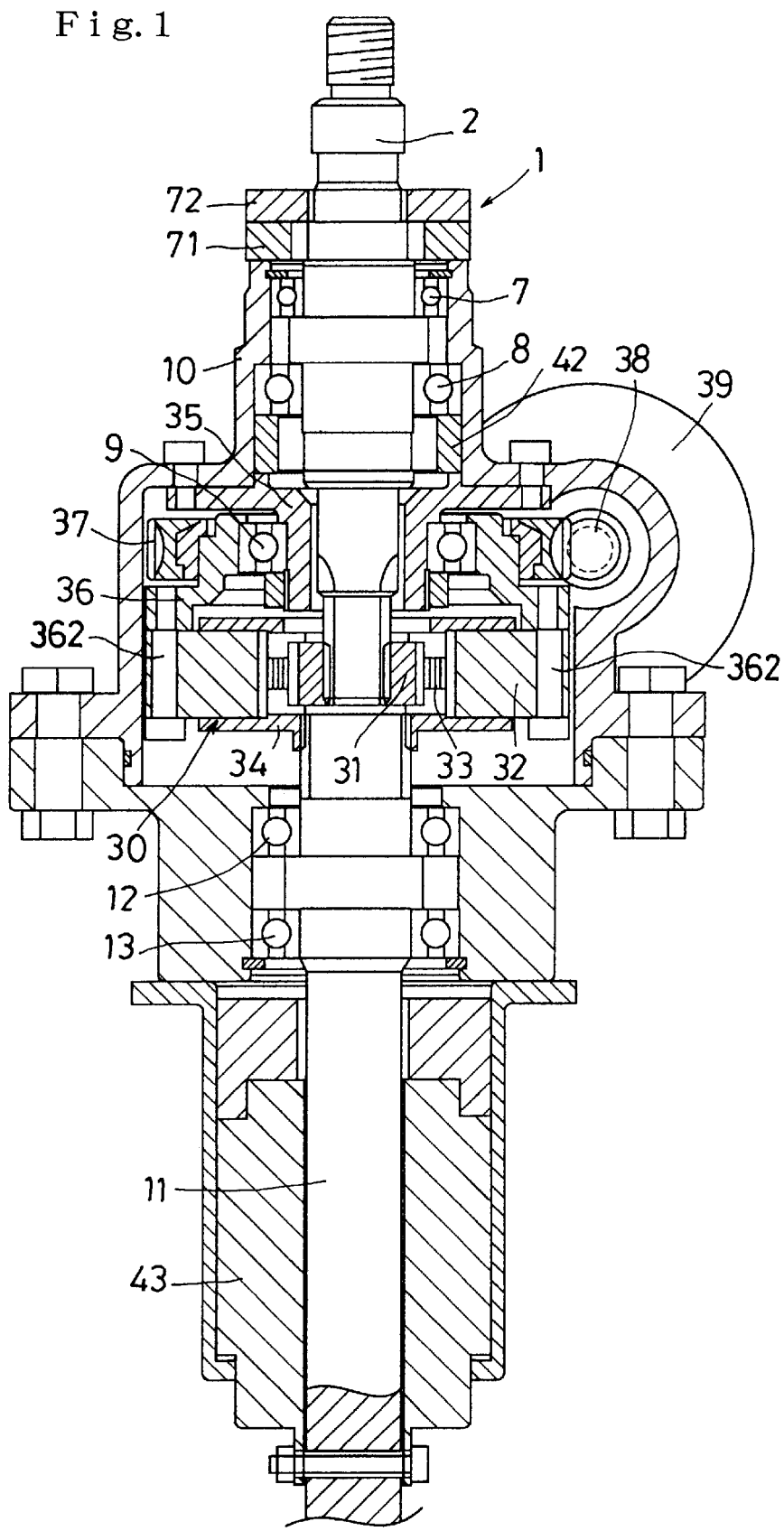
FIG. 1 is a longitudinal sectional view of a steering device constituting an embodiment of the present invention.

The vehicle steering device 1 shown in FIG. 1 comprises an input shaft 2 which is connected to a steering wheel (not shown in the figures). This input shaft 2 is supported by a housing 10 via bearings 7 and 8.

The rotation of the input shaft 2 in accordance with the steering operation is transmitted to an output shaft 11 via a planetary gear mechanism (rotation transmission mechanism) 30. This output shaft 11 is disposed coaxially with the input shaft 2, with a gap being interposed between the two shafts. The output shaft 11 is supported by the housing 10 via bearings 12 and 13. The rotation of the output shaft 11 is transmitted to the wheels of the vehicle by a steering gear such as a rack and pinion type steering gear, a ball and screw type steering gear or the like so that the steering angle varies. A known mechanism can be used as this steering gear. As a result, the rotation of the input shaft 2 corresponding to the steering angle is transmitted to the output shaft 11 via the planetary gear mechanism 30, and the rotation of the output shaft 11 is transmitted to the wheels of the vehicle via the steering gear so that the steering angle varies.

In the planetary gear mechanism 30, planetary gears 33 which engage with a sun gear 31 and a ring gear 32 are held by a carrier 34. The sun gear 31 is connected to the end portion of the input shaft 2 so that the sun gear 31 rotates together with the input shaft 2. The carrier 34 is connected to the output shaft 11 so as to rotate therewith. The ring gear 32 is fastened by means of bolts 362 to a holder 36 that surrounds the input shaft 2. The holder 36 is supported via a bearing 9 by a tubular member 35 which is fastened to the housing 10 so that the tubular member 35 surrounds the input shaft 2. A worm wheel 37 is fit on the outer circumference of the holder 36 so that this worm wheel 37 rotates together with the holder 36. A worm 38 which engages with the worm wheel 37 is supported by the housing 10. The worm 38 is driven by a motor (electromotive actuator) 39 that is attached to the housing 10. As a result, the ring gear 32 which is a constituent element of the planetary gear mechanism 30 is rotationally driven by the motor 39.

Figure 2:
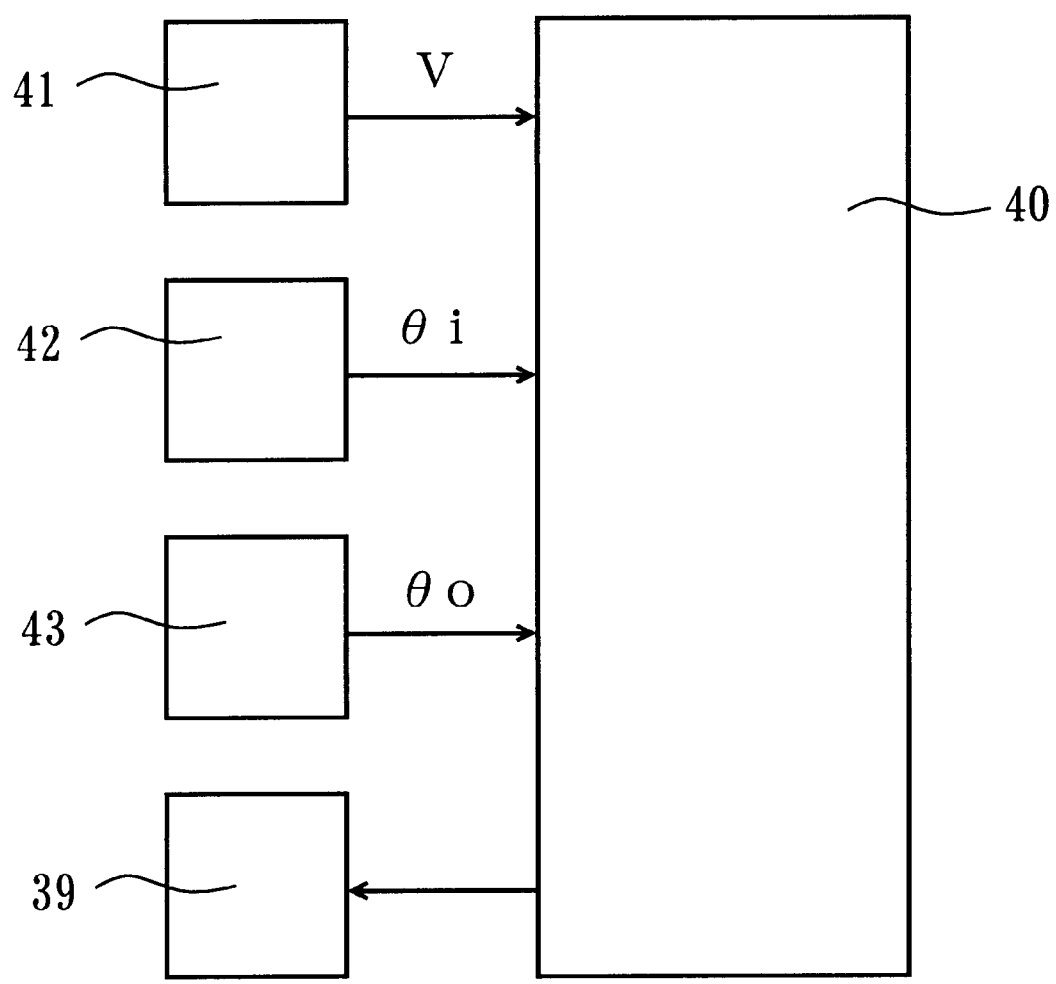
FIG. 2 is an explanatory diagram of the control construction of the steering device constituting the embodiment of the present invention.

For example, a brush-equipped direct-current motor which is driven by using the pulse width modulation method in accordance with a target driving current is used as the motor 39. The ratio of the transmission of rotation from the input shaft 2 to the output shaft 11 is altered by controlling the motor 39 by closed-loop control in accordance with a variable quantity that expresses a traveling condition of the vehicle. In the present embodiment, the variable quantity that expresses the traveling condition of the vehicle is the vehicle speed. Specifically, as shown in FIG. 2, the motor 39 is connected to a vehicle control device 40, and a vehicle speed sensor (traveling condition sensor) 41 is connected to the control device 40. Furthermore, a steering angle sensor (input sensor) 42 which detects the rotational angle of the input shaft 2 as the amount of input into the input shaft 2, and a rotational angle sensor (output sensor) 43 which detects the rotational angle of the output shaft 11 as the amount of output of the output shaft 11, are connected to the control device 40. The control device 40 controls the motor 39 on the basis of the detection values of the sensors 41, 42 and 43 so that the ratio of the transmission of rotation from the input shaft 2 to the output shaft 11 via the planetary gear mechanism 30 varies in accordance with the vehicle speed. For example, the turning characteristics of the vehicle at low speeds and the operating stability of the vehicle at high speeds can be improved by controlling the motor 39 such that the angular speed of rotation of the input shaft 2 and the angular speed of rotation of the ring gear 32 are equal to set the ratio of transmission of rotation from the input shaft 2 to the output shaft 11 to 1 in cases where steering operation is performed when the vehicle speed is zero, and the angular speed of rotation of the ring gear 32 is lowered as the vehicle speed increases to use the planetary gear mechanism 30 as a speed-reduction gear mechanism.

It is possible to control the motor 39 in accordance with the amount of steering operation instead of the vehicle speed, or along with the vehicle speed. The rotational angle of the input shaft 2 detected by the steering angle sensor 42 can be used as the amount of steering operation. For example, the turning characteristics of the vehicle can be improved by increasing the ratio of rotation of the output shaft 11 relative to the input shaft 2 in cases where the rotational angle of the input shaft 2 is large compared to cases where the rotational angle of the input shaft 2 is small.

Figure 3:
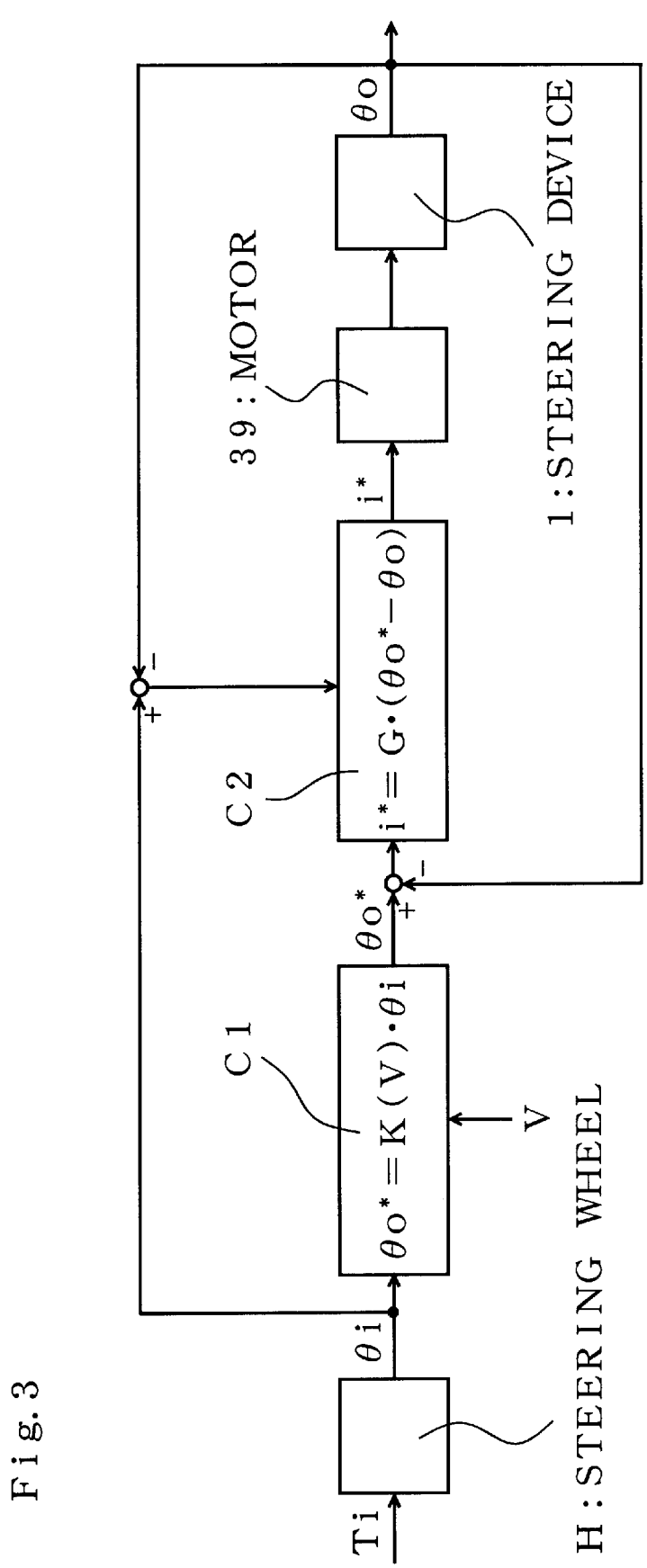
FIG. 3 is a block diagram of the control system in the steering device constituting the embodiment of the present invention.

FIG. 3 is a control block diagram of the control system in the steering device 1. In FIG. 3, Ti is the steering torque of the steering wheel H, V is the detection value obtained by the vehicle speed sensor 41, θi is the detection value of the rotational angle of the input shaft 2 obtained by the steering angle sensor 42, θo is the detection value of the rotational angle of the output shaft 11 obtained by the rotational angle sensor 43, θo* is the target rotational angle which is the target control amount of the output shaft 11, i* is the target driving current of the motor 39, C1 is a controller for controlling the target rotational angle θo* of the output shaft with respect to the rotational angle θi of the input shaft 2, and C2 is a controller for controlling the target driving current i* of the motor 39 with respect to the deviation (θo*−θo) between the target rotational angle θo* and rotational angle θo of the output shaft 11.

Figure 4:
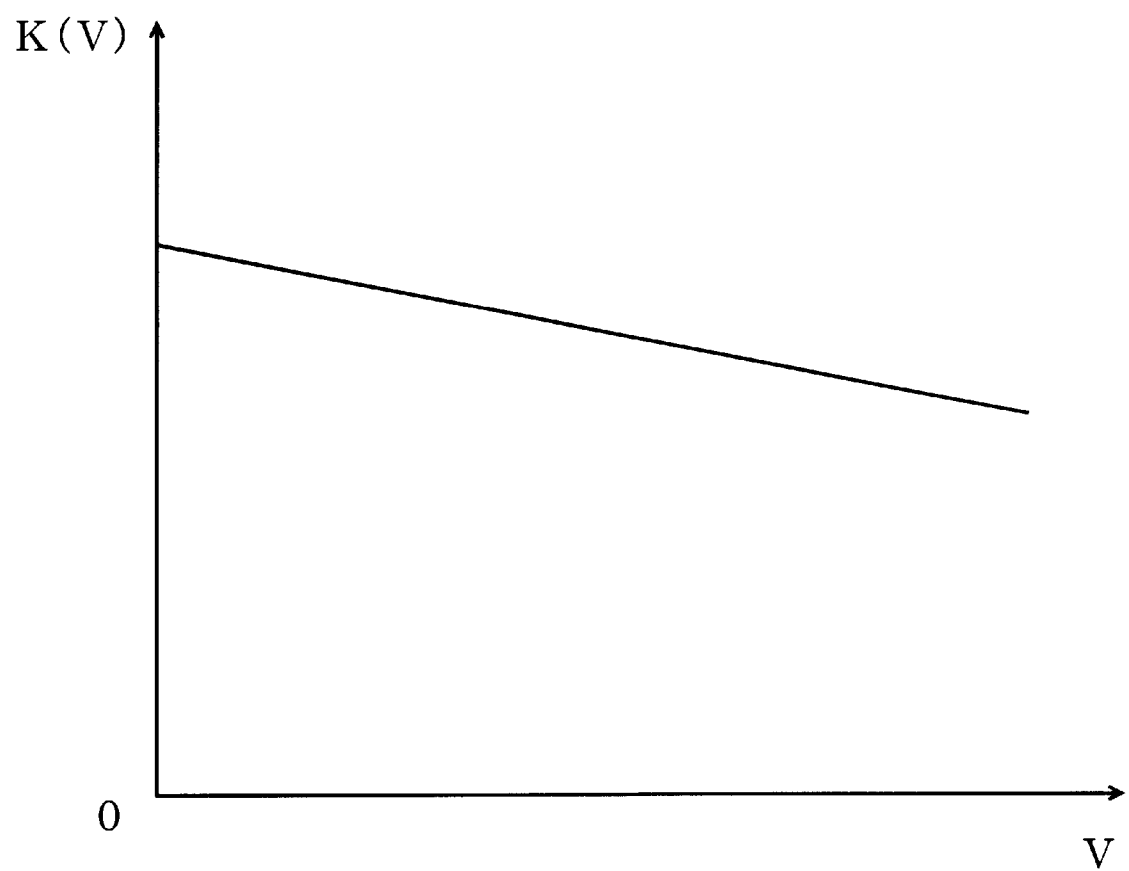
FIG. 4 is a graph which shows one example of the relationship between the proportional gain K(V) and the vehicle speed V in the control system of the steering device constituting the embodiment of the present invention.

The control device 40 calculates the target rotational angle θo* of the output shaft 11 with respect to the rotational angle θi of the input shaft 2 detected by the steering angle sensor 42 on the basis of a predetermined and stored relationship. In the present embodiment, the controller C1 for controlling the target rotational angle θo* of the output shaft with respect to the rotational angle θi of the input shaft 2 is a proportional control element, and thus the target rotational angle θo* of the output shaft is determined by a formula of θo*=K(V)·θi. Here, K(V) is the proportional gain, and is taken as a function of the vehicle speed V. The proportional gain K(V) that expresses the relationship between the rotational angle θi of the input shaft 2, vehicle speed V and target rotational angle θo* is stored in the control device 40. As shown in FIG. 4, for example, the proportional gain K(V) is taken as a value that decreases with an increase in the vehicle speed V, and this relationship is stored in the control device 40. The control device 40 calculates the target rotational angle θo* of the output shaft 11 on the basis of the stored proportional gain K(V), detected rotational angle θi of the input shaft 2 and detected vehicle speed V.

The control device 40 stores the relationship between the target driving current i* corresponding to the target control amount of the motor 39 and the deviation (θo*−θo) of the target rotational angle θo* and detected rotational angle θo of the output shaft 11. In the present embodiment, the controller C2 for controlling the target driving current i* with respect to the deviation (θo*−θo) is a proportional integral (PI) control element, and this target driving current i* is determined by a formula of i*=G·(θo*−θo). Here, G is a transfer function, for example, where Kg is the gain, s is the Laplace operator and T is a time constant, this transfer function G is determined as G=Kg·[1+1/(T·s)] so that PI control is performed. The gain Kg and time constant T are set so that optimal control can be accomplished. This transfer function G is stored in the control device 40.

The control device 40 calculates the target driving current i* of the motor 39 on the basis of the stored transfer function G and the calculated deviation (θo*−θo) between the target rotational angle θo* and detected rotational angle θo of the output shaft 11. The motor 39 is driven by the application of this calculated target driving current i*.

Figure 5:
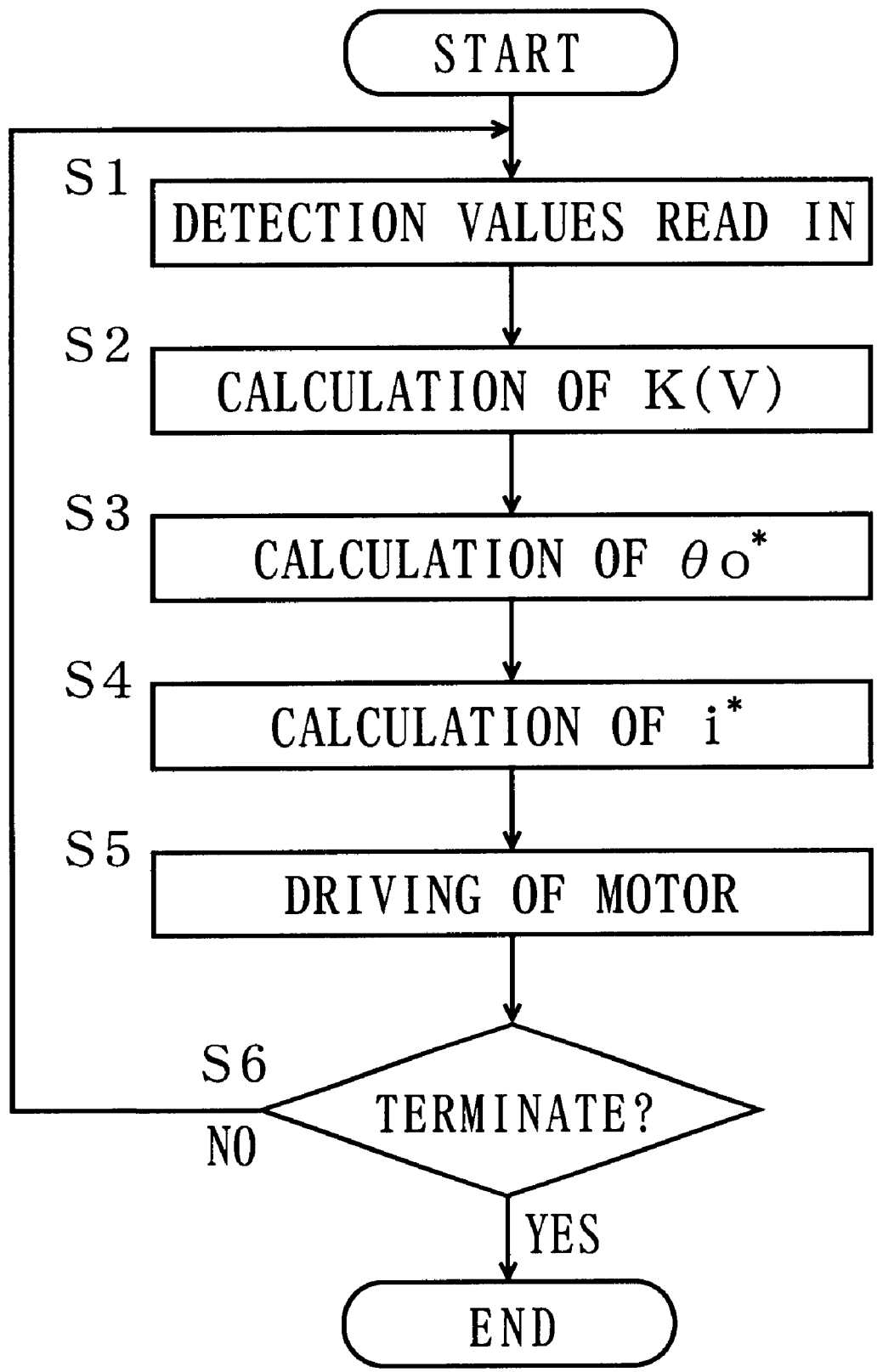
FIG. 5 is a flow chart which illustrates the control procedure in the steering device constituting the embodiment of the present invention.

The flow chart in FIG. 5 illustrates the control procedure performed by the control device 40.

First, the detection values of the respective sensors 41, 42 and 43 are read in (step S1). Next, the proportional gain K(V) corresponding to the vehicle speed V is determined (step S2). Next, the target rotational angle θo* of the output shaft 11 is calculated from the determined proportional gain K(V) and the detected rotational angle θi of the input shaft 2 (step S3). Next, the target driving current i* is calculated from the transfer function G and the deviation (θo*−θo) between the target rotational angle θo* and the detected rotational angle θo of the output shaft 11 (step S4). The motor 39 is controlled on the basis of this target driving current i* (step S5). Next, a judgement is made as to whether or not control is terminated according to a judgement, for example, as to whether or not the ignition switch of the vehicle is on (step S6). In cases where the control is not terminated, the processing returns to step S1.

According to the above-mentioned constitution, the motor 39 that drives the ring gear 32 of the planetary gear mechanism 30 is controlled by closed-loop control, therefore it is not necessary to use a stepping motor as the motor 39. Furthermore, the amount of input into the input shaft 2 corresponds to the amount of steering operation, and the amount of output of the output shaft 11 corresponds to the steering angle. Therefore, control for the purpose of altering the ratio of the steering angle to the amount of steering operation can be accurately performed, by directly detecting the amount of input into the input shaft 2 and the amount of output of the output shaft 11 with the sensors 42 and 43 so as to determine the target driving current i* of the motor 39 in accordance with the detected amounts.

The present invention is not limited to the above-mentioned embodiment. For example, the transfer function G and the relationship between the target rotational angle θo* of the output shaft 11 and the rotational angle θi of input shaft 2 are not limited to the above-mentioned embodiment, that is, there are no particular restrictions on the construction of the control system as long as control can be performed in accordance with traveling conditions such as the vehicle speed, amount of steering operation or the like so that the ratio of the transmission of rotation from the input shaft 2 to the output shaft 11 can be altered by the electromotive actuator. Furthermore, it is also possible to use a construction in which the ring gear 32 or carrier 34 of the planetary gear mechanism 30 is connected to the input shaft 2, the constituent element of the planetary gear mechanism 30 that is connected to the output shaft 11 is the sun gear 31 or ring gear 32 whichever is not connected to the input shaft 2, and the constituent element of the planetary gear mechanism 30 that is driven by the motor 39 is the sun gear 31 or carrier 34 whichever is not connected to the input and output shafts 2 and 11. Specifically, it is sufficient if one of the planetary gear elements, i.e., the sun gear 31, ring gear 32 or carrier 34, is connected to the input shaft 2, while one of the planetary gear elements that is not connected to the input shaft 2 is connected to the output shaft 11, and the remaining planetary gear element that is not connected to the input shaft and output shaft is rotationally driven by the motor 39. Furthermore, the present invention can also be applied to steering devices in which rotation is transmitted from the input shaft 2 to the output shaft 11 via a rotation transmission mechanism other than a planetary gear mechanism 30, e.g., a planetary cone type rotation transmission mechanism.

What is claimed is:

1. A steering device according in which the rotation of an input shaft in accordance with the steering operation is transmitted to an output shaft via a rotation transmission mechanism, the rotation of the output shaft is transmitted to the wheels of the vehicle by a steering gear so that the steering angle varies, and an electromotive actuator used to drive a constituent element of the rotation transmission mechanism is controlled by a control device in accordance with a variable quantity that expresses a traveling condition of the vehicle, said steering device comprising:

an input sensor for detecting the amount of input into the input shaft;

an output sensor for detecting the amount of output of the output shaft; and a traveling condition sensor for detecting the variable quantity that expresses the traveling condition; wherein the control device controls the electromotive actuator by closed-loop control on the basis of the detection values of the input sensor, output sensor and traveling condition sensor so that the ratio of the transmission of rotation from the input shaft to the output shaft varies in accordance with the variable quantity that expresses the traveling condition;

the rotational angle of the output shaft is detected as the amount of output by the output sensor;

at least one of the vehicle speed and the amount of the steering operation is detected as the variable quantity that expresses the traveling condition;

the rotation transmission mechanism is constituted by a planetary gear mechanism in which a planetary gear that engages with a sun gear and a ring gear is held by a carrier, a first planetary gear element that is one of the elements consisting of the sun gear, ring gear and carrier is connected to the input shaft, a second planetary gear element that is another one of the elements consisting of the sun gear, ring gear and carrier and that is not connected to the input shaft is connected to the output shaft, a third planetary gear element that is the other of the elements consisting of the sun gear, ring gear and carrier and that is not connected to the input and output shafts is rotationally driven by the electromotive actuator; and the control device stores a first relationship between the amount of input into the input shaft, the variable quantity that expresses the traveling conditions and the target control amount of the output shaft, calculates the target control amount of the output shaft on the basis of the stored first relationship, the detection value of the input sensor and the detection value of the traveling condition sensor, stores a second relationship between the target control amount of the electromotive actuator and the deviation between the target control amount of the output shaft and the amount of output of the output shaft, calculates the target control amount of the electromotive actuator on the basis of the stored second relationship, the calculated target control amount of the output shaft and the detection value of the output sensor, and controls the electromotive actuator on the basis of the calculated target control amount.

* * * * *